Dec. 11, 1934.  A. RICE  1,983,707
DISPENSING RECEPTACLE
Filed Nov. 22, 1933  4 Sheets-Sheet 1
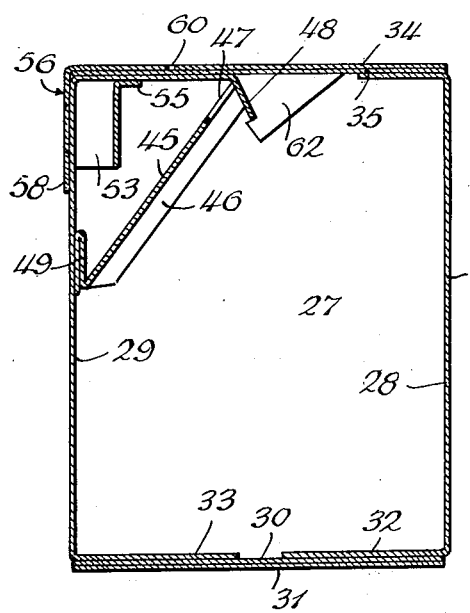
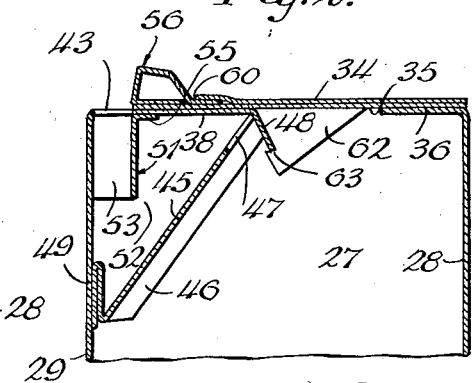
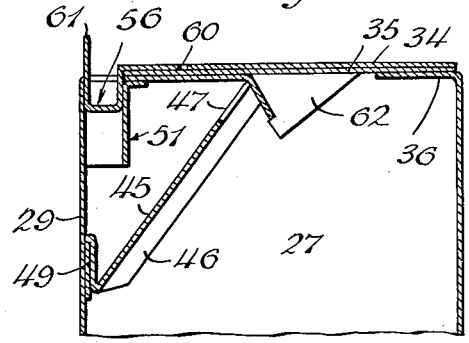
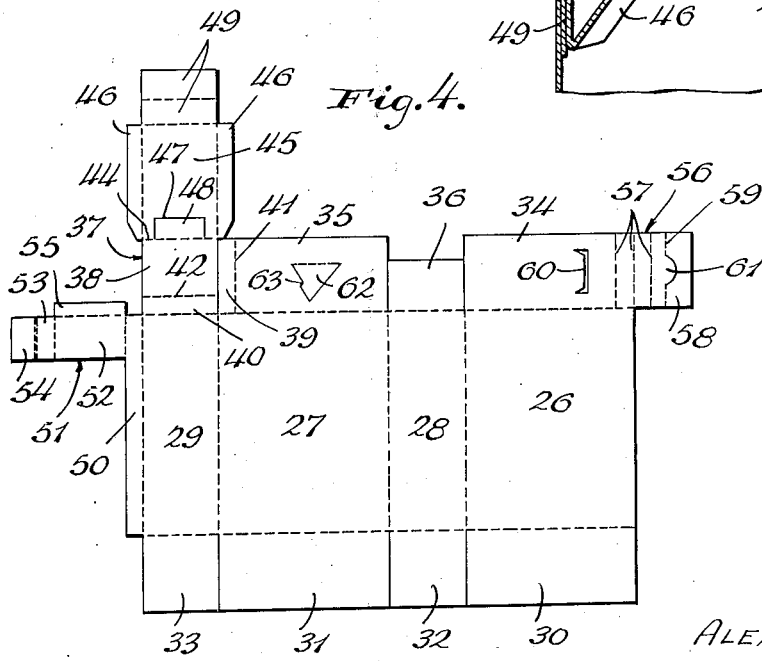
INVENTOR
ALEXANDER RICE
BY
*Mueller & Bull*
ATTORNEYS

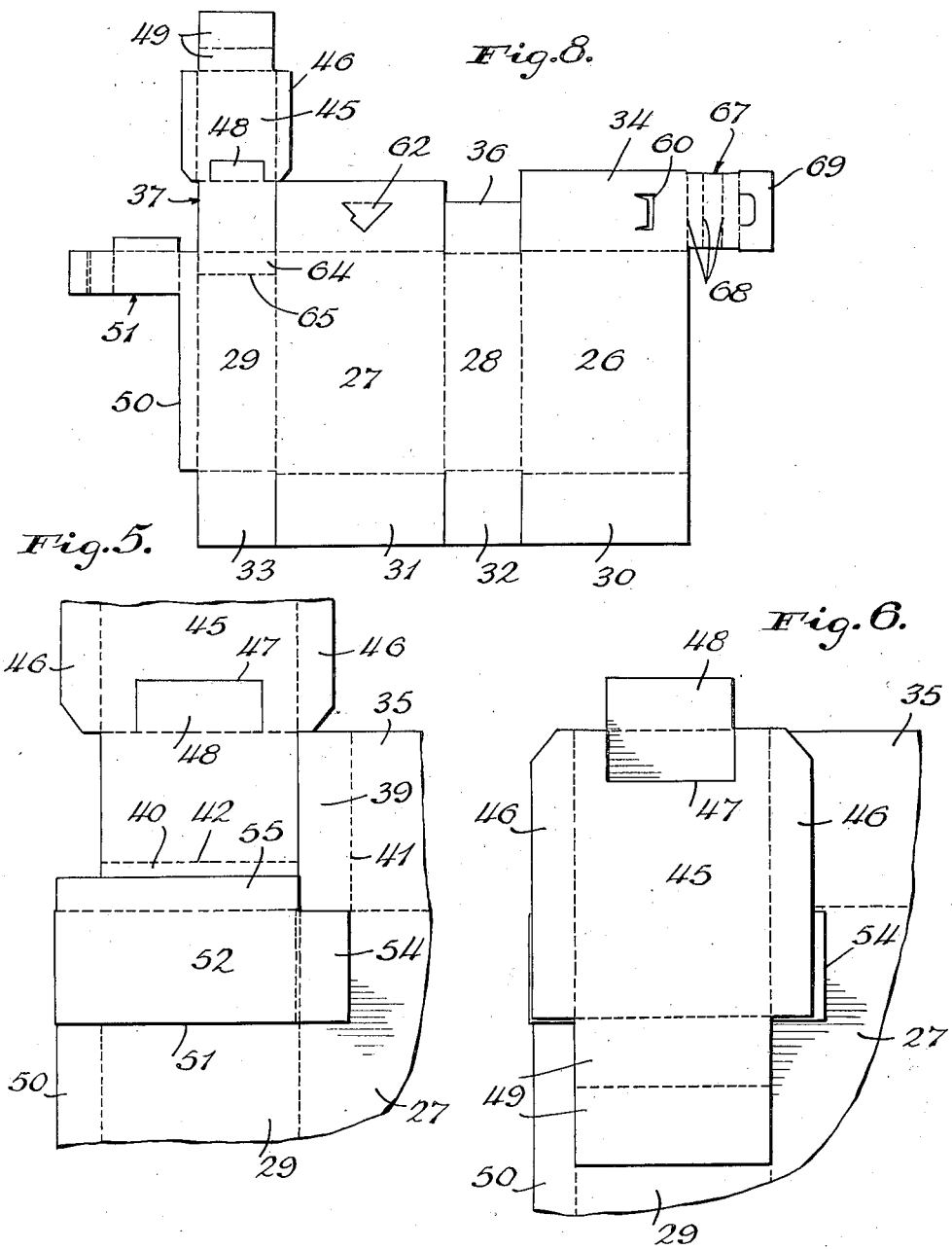

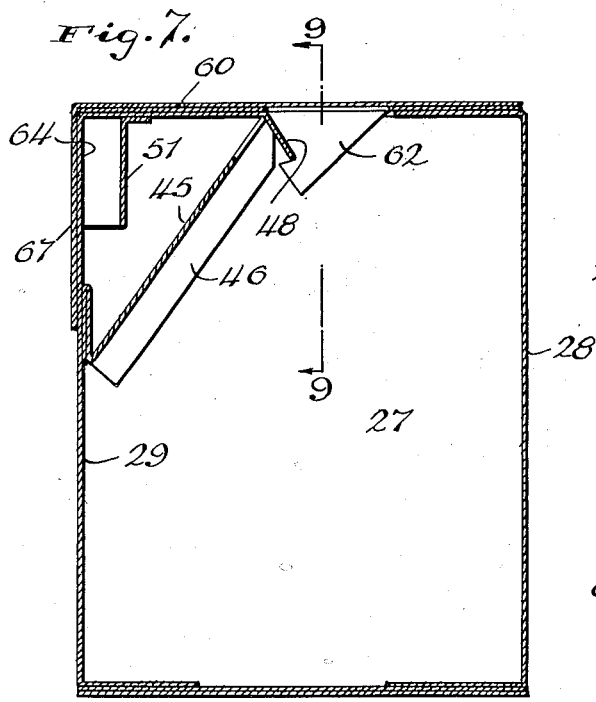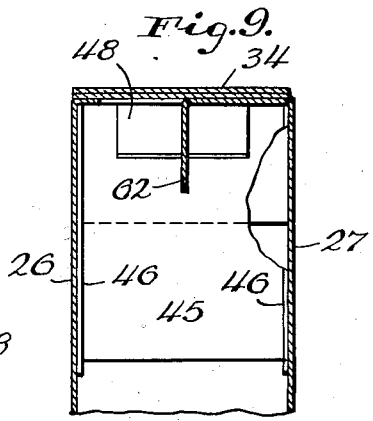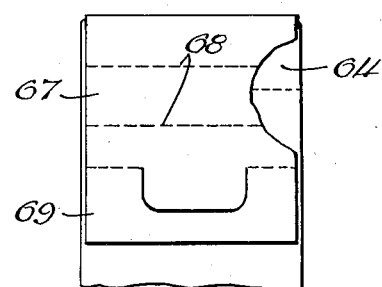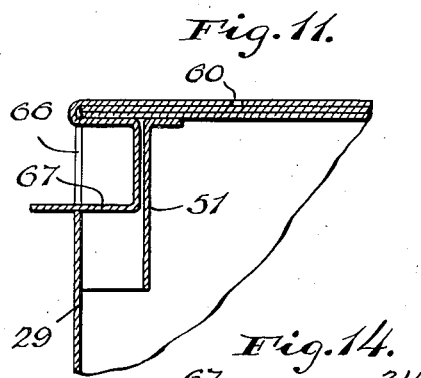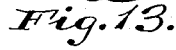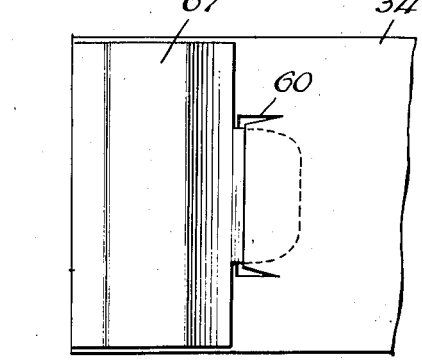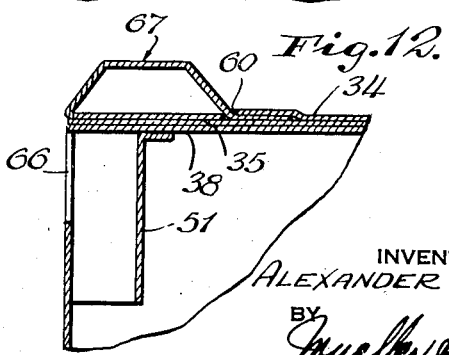

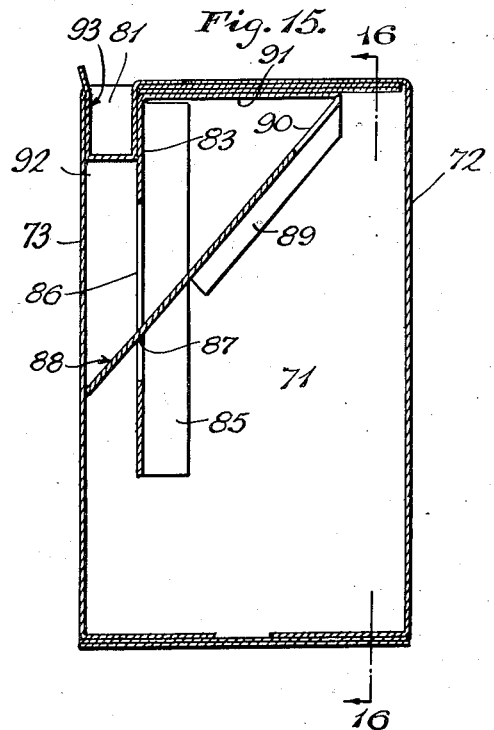
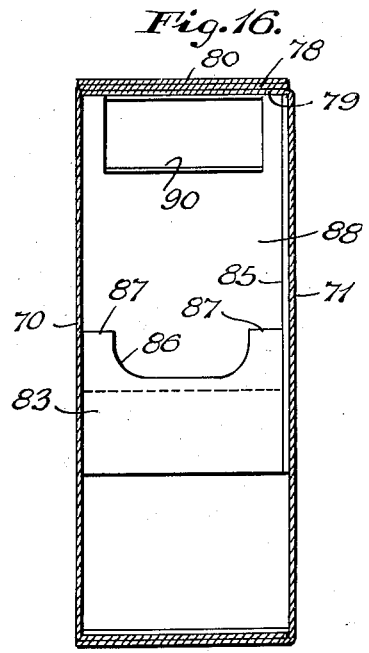
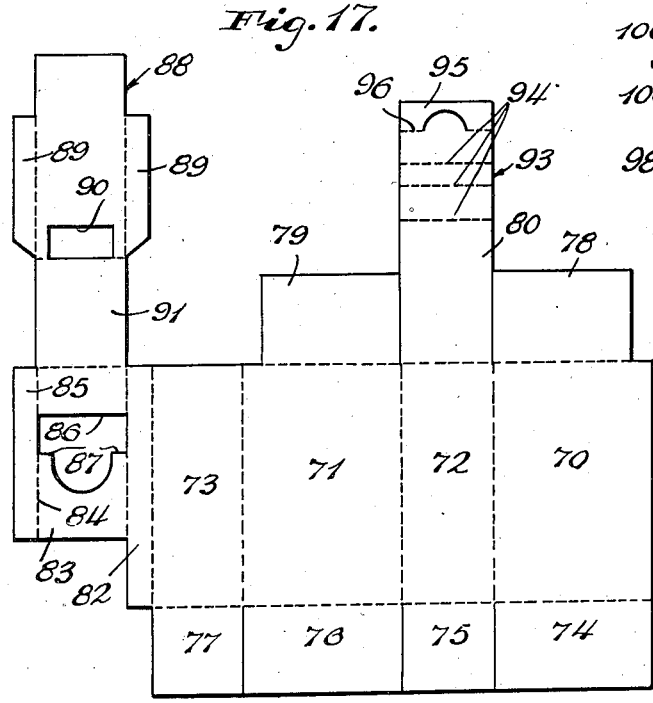
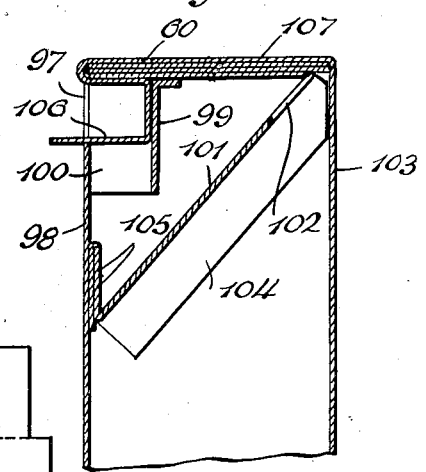

Patented Dec. 11, 1934

1,983,707

UNITED STATES PATENT OFFICE 1,983,707

DISPENSING RECEPTACLE

Alexander Rice, Brooklyn, N. Y.

Application November 22, 1933, Serial No. 699,101

16 Claims. (Cl. 221—98)

This invention relates to improvements in dispensing receptacles and has particular reference to a receptacle of the kind shown in my United States Letters Patent #1,931,270, dated October 17, 1933, wherein predetermined or measured quantities of material are adapted to be discharged from the receptacle upon each tilting thereof.

An object of the invention is to simplify and make more practical this type of receptacle by so constructing and arranging the elements which constitute the measuring means and the closure for the receptacle that the quantities of material discharged will always be constant and leakage of said material prevented, and the discharge opening in the receptacle effectively maintained in closed condition when the receptacle is not in use.

The above and other objects will appear more clearly from the following detailed description when taken in connection with the accompanying drawings which illustrate preferred embodiments of the inventive idea.

In the drawings:

Figure 1 is a vertical longitudinal section through a receptacle showing one form of the invention, and with the closure for the receptacle in sealed position.

Figure 2 is a fragmentary sectional view similar to Figure 1, with the closure in opened position.

Figure 3 is a view similar to Figure 2 showing the closure in the closed position which it is adapted to assume once the seal has been broken to discharge the first measured quantity of material from the receptacle.

Figure 4 is a plan view of the blank from which the receptacle of Figure 1 is formed.

Figure 5 is a fragmentary plan view of the blank in a partially folded position, and before the receptacle is set up in operative condition.

Figure 6 is a view similar to Figure 5 showing a secondary step in the folding operation.

Figure 7 is a view similar to Figure 1 illustrating a slightly modified form of invention in which the discharge or outlet opening is in a side of the body of the receptacle instead of the top thereof.

Figure 8 is a plan view of the blank from which the receptacle of Figure 7 is made.

Figure 9 is a section on the line 9—9 of Figure 7.

Figure 10 is a fragmentary front elevation of the receptacle of Figure 7, partly broken away.

Figure 11 is a fragmentary sectional view similar to Figure 3.

Figure 12 is also a fragmentary sectional view showing the closure member for the discharge outlet in an opened position.

Figure 13 is a fragmentary front elevation with the closure in the position shown in Figure 11.

Figure 14 is a top plan view with the closure member in the position of Figure 12.

Figure 15 is a view similar to Figure 1 showing another modified form of the invention.

Figure 16 is a section on the line 16—16 of Figure 15.

Figure 17 is a plan view of the blank from which the receptacle of Figure 15 is made.

Figure 18 is a fragmentary vertical section of still another form of the invention.

Referring to the form of the invention illustrated in Figures 1 to 4, and more particularly to the last-named figure, it will be seen that the receptacle is made from a single blank of suitable material cut and scored to provide the side walls 26 and 27 and the end walls 28 and 29. The receptacle bottom is constituted by the long flaps 30, 31 and the short flaps 32, 33 adjoining the side and end walls, respectively, of the body of the receptacle, said flaps being foldable and secured together in the customary manner to form said bottom. The blank is further scored to provide the top closure flaps 34 and 35 which are continuations of the side walls 26 and 27, and to further provide the closure flap 36 contiguous to the end wall 28.

Projecting from the upper end of the end wall 29 is an extension generally indicated by the numeral 37, the innermost portion 38 of which is adapted to underlie the flap 35 when the receptacle is in its set-up position. When thus located, two areas 39 and 40, defined by score lines 41 and 42, on the elements 35 and 38, respectively, are in superimposed relation and are adapted to be cut away or otherwise removed to form a discharge opening 43 (Figure 2) in the top of the receptacle. From the score line 44 of the extension 37 to the outer extremity of the latter the material is utilized to form a diagonally extending partition 45 in the top of the receptacle and adjacent the discharge opening 43. The longitudinal edges of the partition 45 are provided with flanges 46 designed to engage the opposed walls 26 and 27 to impart rigidity to the partition and also prevent the inadvertent passage of the contents of the receptacle between the longitudinal edges of the partition and contiguous side walls. The material in the receptacle is, however, intended to pass through the partition 45 at its upper end, when the receptacle is inverted, and for this purpose the partition, at its inner end as viewed in Figure 4, is cut away adjacent the folding line 44 to provide an opening 47. The cut material constitutes a baffle member 48 the purpose of which will appear in the course of the description. At the outer extremity of the partition 45, securing flaps 49 are provided. When the partition is in position, these flaps are doubled upon themselves as shown in Figures 1 to 3 and the outermost flap is secured to the end or front wall 29 by a suitable adhesive, thus affixing the partition 45 in a permanent position within the receptacle.

The end of the blank at which the wall 29 is formed has projecting therefrom a section 50 the upper end of which is provided with a lateral extension generally indicated by the numeral 51 which constitutes a discharge chute that is associated with the opening 43 and which is disposed in the chamber formed by the partition 45 in the upper corner of the receptacle. The chute comprises the wall 52 of the same width as the wall 29 and extends parallel thereto when in operative position. The outer end of the section 50 forms one of the end walls of the chute and a section 53 at the other end of the wall 52 forms the other end wall of said chute. A securing flap 54 joined to the wall 53 is adapted to be secured to the side wall 27 in order to affix the chute in position. A flange 55 extending from the upper edge of the wall 52 is adapted to engage the under surface of the portion 38, when the receptacle is in set-up position, to prevent leakage of material between said portion 38 and the upper edge of the wall 52 of the chute.

At the right hand end of the blank, the closure flap 34 is shown as having one end extending beyond the outer edge of the wall 26. This projecting end, together with a small portion of the flap 34 extending inwardly from the adjacent end of the body of the blank, provides a closure member generally indicated by the numeral 56 which is scored transversely on the lines 57 so that said member can be bent as indicated in Figures 2 and 3 for positioning the closure both in opening and closing relation to the discharge outlet 43. When the closure member is in its original closing position, as shown in Figure 1, the same depends from the next to the innermost score line 57 along the outer surface of the front wall 29, and the outermost section 58 of said closure member is secured to said wall 29 by a suitable adhesive. When the receptacle is to be initially opened the closure member may be severed along the line 59, leaving the section 58 secured to the wall, with the remainder of the closure member free to be manipulated as shown in Figures 2 and 3. For the purpose of retaining the closure member in the position shown in Figure 2, the flap 34 is provided with a slot 60 which is adapted to receive the projection 61 on the free end of the closure member and when the chute 51 is to be closed after having poured some of the contents from the receptacle through said chute, said closure member may be inserted through the opening 43 and into the outer end of the chute as shown in Figure 3.

The top flap 35 has struck therefrom a substantially triangular supporting lug 62 which is adapted to depend from said flap and which is notched along one edge as indicated at 63 to receive the free edge of the baffle member 48 so as to retain the latter in a downwardly diverging position with respect to the partition 45.

In folding the blank preparatory to setting up the same to form a receptacle, the extension forming the chute 51 is first bent over upon the wall 29, as shown in Figure 5 and the flap 54 is secured by an adhesive to the wall 27. The extension 37 is then folded upon the transverse score line 44, as illustrated in Figure 6, so as to overlie the extension 51, and the outer flap 49 is then secured by an adhesive to the wall 29. In this position, the blank is flat and can be stacked with others so as to be readily transported prior to being set-up to form the receptacle. When assembling the receptacle for use, the blank is folded along its several score lines which will result in the discharge chute assuming its operative position shown in Figures 1 to 3. The partition 45 will also assume the position shown in the latter figures and the adjoining portion 38 of said partition will underlie the flaps 34 and 35, with the latter flap in an intermediate position. By depressing the supporting lug 62, before the top flap 34 is folded down, the notch 63 in said lug may then be engaged by the edge of the baffle member 48 so that it will be held in its cooperative relation to the partition 45 adjacent the opening 47 therein. After the closure flap 34 is folded down, the closure member 56 may then be secured to the wall 29 as shown in Figure 1. The receptacle is initially opened by severing the closure flap on the line 59 and the loosened part is then folded back to the position shown in Figure 2. The sections 39 and 40 are then removed by a suitable cutting implement so as to form the opening 43. To effect an initial discharge of a predetermined quantity of the material from the receptacle, the latter is inverted so that the material therein will fall into the space between the partition 45 and the baffle member 48 and flow through the opening 47 to enter the chamber formed by said partition to the level of the then upper edge of said opening 47. The receptacle is then restored to its upright position whereupon the material in said chamber will flow downwardly along the inclined partition and accumulate at the lower end of the chamber just below the discharge chute 51. The receptacle is again inverted and the initial predetermined quantity of material will then flow outwardly through the chute 51 and opening 43. Upon the second inversion of the receptacle, another predetermined quantity of the material is accumulated as in the first instance and this material will, as before, flow downwardly into the chamber formed by the partition 45 when the receptacle is again righted after the first predetermined quantity has been poured through the discharge chute. After the desired quantity of material has been removed from the receptacle, the closure member 56 is bent on the lines 57 and inserted into the discharge chute, as shown in Figure 3, thereby sealing the opening 43 until such time when it is again desired to extract a predetermined amount of material from the receptacle, said material being then within the chamber formed by the partition 45 and ready to be exhausted therefrom when the closure member 56 is withdrawn and the receptacle again tilted.

The form of the invention shown in Figures 7 to 13, inclusive, is quite similar to that illustrated in Figure 1 but differs therefrom principally by having the discharge outlet for the receptacle in one side thereof and the member or flap for closing said opening constructed accordingly. Thus, from a comparison of Figures 4 and 8, it will be seen that, with respect to the discharge opening or outlet, in the former construction said opening is defined by the provision of two portions or areas 39, 40 which are adapted to be removed to form an opening in the top of the receptacle, while in the latter construction only one of such portions or areas 64 is provided and located at the upper end of the end wall 29 and defined by the score line 65. Thus, a removal of this portion 64 will form an opening or outlet 66 (Figures 11 and 12) in the wall 29 which forms one side of the receptacle. With the outlet thus disposed, it is necessary that the closure member generally indicated by the numeral 67 be a little differently constituted from the corresponding closure member 56, both however being formed at one end of the closure flap 34. To provide the necessary folds whereby the closure member may be inserted into the opening 66, as indicated in Figure 11, the member 67 is scored transversely on the lines 68 and, contrary to the similar scorings 57 of the member 56, it will be noted that the innermost score line 68 is in direct alignment with the adjacent edge of the body section of the blank, instead of inwardly thereof as in Figure 4. This allows the entire closure member, extending outwardly from the innermost line 68, to depend along the front wall 29 to which the outermost section 69 of the closure member is secured in the same manner as the section 58 when the receptacle is originally sealed. In opening the receptacle, the three innermost sections of the member 67 are severed from the section 69 so as to uncover the portion 64 which can then be cut from the wall 29 to form said opening 66. The portion of the closure member 67 which still remains attached to the closure flap 34 may then be bent over the top of the receptacle, as shown in Figure 12, and the free extremity thereof inserted into the slot 60 just as in the form of the invention shown in Figures 1 to 4. By thus positioning the closure member the opening 66 is exposed and the receptacle may be tilted to pour therefrom a predetermined or measured quantity of material in the same manner as previously described. When desiring to close the opening 66 the member 67 is swung from the position shown in Figure 12 to that illustrated in Figure 11, this movement being substantially about the innermost score line 68 which is so disposed, in this instance, that the material of the closure adjacent said score line may be bent around the adjacent ends of the flaps 34 and 35, and the remainder of the closure then inserted through the opening 66. In this position the portion of the closure adjacent its free extremity rests upon the lower edge of the opening 66, with the extremity of said closure projecting beyond the wall 29 so that it can be readily grasped when it is desired to withdraw the closure and again uncover the opening. Otherwise, the construction of the receptacle is the same as shown in Figures 1 to 4 and further description of the present modification is therefore deemed unnecessary. Also, it is to be noted that in folding the blank of Figure 8, the same procedure may be followed as described in connection with Figures 5 and 6.

In the form of the receptacle shown in Figures 15 to 17, inclusive, the blank from which the receptacle is formed is cut and scored to provide side walls 70 and 71, and end walls 72 and 73.
These walls are provided with the customary bottom closure flaps 74 to 77, while the upper ends of the side walls 70, 71 have the top closure flaps 78 and 79, respectively, both of which are narrower than said side walls. A third top closure flap 80 projects from the upper end of the end wall 72. The closure flaps 78 and 79 are made shorter than the width of their respective walls so that when the receptacle is in its set-up position and said closure flaps are folded down upon each other in superposed relation the reduced ends of said flaps will be brought into alignment and being short of the front wall 73, said ends will combine with the upper edge of the latter wall to form in the top of the receptacle the outlet or discharge opening 81.

A section 82 at the left hand end of the blank (Figure 17) is provided with an extension 83 which is scored longitudinally along the line 84 to define a securing flap 85 adapted to be attached to the wall 71 to maintain the extension 83 in operative position when the receptacle is assembled. Extension 83 is provided with an opening 86 the lower portion of which is reduced to form of pair of shoulders 87 for a purpose which will presently appear. Projecting from the upper end of the extension 83 is a partition member generally indicated by the numeral 88 and provided intermediate its ends and on its longitudinal edges with the flanges 89 having the same purpose as the flanges 46 of the first embodiment described herein. Also at an intermediate point the partition member has an opening 90 formed therein through which material from the receptacle enters the compartment formed by the partition member 88 when the latter is in its operative position as shown in Figure 15. In setting up the receptacle, the member 88 is folded so that its inner portion 91 will engage the under side of the innermost of the two flaps 78, 79 and the remaining or outer portion of said partition member is then extended forwardly in a diagonal direction so as to project through the opening 86 and have its lowest extremity contact the wall 73, said partition member then resting upon the shoulders 87 so that the reduced portion of the opening 86 will appear below the partition. The purpose of this reduced portion is to prevent any accumulation of material in the space between the partition member and the wall 73 below said partition member, when the receptacle is tilted to pour the material therefrom. In other words, by the provision of this reduced portion of the opening it will be apparent that when the receptacle is tilted, any material which may enter the space just referred to will pass through the reduced portion of the opening 86 and into the main body of the receptacle. The portion of the section 83 between the upper edge of the opening 86 and the adjacent end of the portion 91 of the partition member combines with the wall 73 to form a discharge chute 92 through which a measured quantity of material in the compartment provided by the partition 88 is poured when the receptacle is inverted. The present receptacle is especially adapted for containing various kinds of cereals, for instance, the grains or particles of which are comparatively large, and therefore the use of a baffle member such as the element 48 is not employed. Instead, the rear or end wall 72 of the receptacle acts as a baffle member and combines with the partition 88 to accumulate a quantity of material, when the receptacle is inverted, which will pass through the opening 90 into the compartment formed by said partition 88.

The closure member generally indicated by the numeral 93 is, in the present embodiment, formed as an extension of the top closure flap 80 and is scored transversely on the lines 94 to provide the various folds which permit of the closure being inserted into the opening 81 as shown in Figure 15 so as to close the outer end of the discharge chute 92 when material is not being dispensed from the receptacle. Said closure member, like the others described, is provided with an outer section 95 which is adapted to be attached by an adhesive to the front wall 73 when the receptacle is originally sealed, the innermost portion of the closure member then extending over and closing the opening 81. When originally opening the receptacle, the closure member is severed on the transverse score line 96 so that said member may be folded back to expose the opening 81 after which the receptacle may be inverted or tilted to pass the first predetermined quantity of material into the compartment formed by the partition 88.

The receptacle of Figure 18 is somewhat similar to that shown in Figure 15 and differs therefrom mainly in the formation of the discharge outlet or opening 97 in the upper end of the front wall 98 of the receptacle. Like in Figure 17, an extension 99, at one end of the blank from which the receptacle is formed, provides a discharge chute 100 communicating with the opening 97. A partition member 101 is disposed diagonally of the receptacle so as to constitute a measuring compartment communicating with the discharge chute 100. Said partition member is provided at its upper end with an opening 102 communicating with the interior of the receptacle so as to permit material to flow into said compartment when the receptacle is inverted and again, as in Figure 15, the rear wall 103 of the receptacle acts as a baffle which cooperates with the partition 101 so as to direct material through the opening 102. The partition 101 is provided with flanges 104 which engage the side walls of the receptacle. At the lower end of said partition there are provided the flaps 105 foldable against each other with the outermost flaps secured to the wall 98 by an adhesive so as to maintain the partition in position. The closure member 106 is formed as an extension of the top closure flap 107, as in Figure 15 and may be originally secured to the front wall 98 the same as the closure member 93.

What is claimed is:

1. A dispensing receptacle comprising a body having a discharge outlet, means cooperating with a wall of said body to discharge a measured quantity of material through said outlet upon inversion of said body, top closure flaps for said body, and a closure member extending from one of said flaps and foldable so as to be inserted into said outlet for closing the same.

2. A dispensing receptacle comprising a body having a discharge outlet, means cooperating with a wall of said body to discharge a measured quantity of material through said outlet upon inversion of said body, top closure flaps for said body, and an elongated closure member extending from one of said flaps and scored transversely to provide a plurality of lines upon which the closure is folded for insertion into said outlet with an extremity of the closure projecting therefrom.

3. A dispensing receptacle comprising a body having a discharge outlet and an end wall, means cooperating with said wall to discharge a measured quantity of material through said outlet upon inversion of said body, closure flaps for said body adjacent said outlet, and a closure member extending from one of said flaps for covering said outlet and having a section secured to said wall, the main portion of said closure member being severable from said section to uncover said outlet and foldable for insertion into said outlet to close the same.

4. A dispensing receptacle comprising a body having an outlet, a discharge chute within said body and communicating with said outlet, a partition combining with a wall of said body to form a compartment in communication with said chute, a baffle cooperating with said partition to direct a measured quantity of material into said compartment for discharge through said chute and outlet, closure flaps for one end of said body, and a closure member extending from one of said flaps and foldable for insertion into said outlet and chute so as to close the same.

5. A dispensing receptacle comprising a body including side and end walls, closure flaps on said side walls, said body having a discharge outlet, means cooperating with certain of said walls to discharge a measured quantity of material through said outlet, and a closure member forming an extension of one of said closure flaps and covering said outlet, said closure member having a section secured to one of said end walls, and the main portion of said closure member being severable from said section to uncover said outlet and foldable for insertion into said outlet to close the same.

6. A dispensing receptacle comprising a body including side and end walls, closure flaps on said side walls, said body having a discharge outlet, means cooperating with certain of said walls to discharge a measured quantity of material through said outlet, and a closure member forming an extension of one of said closure flaps and covering said outlet, said closure member having a section secured to one of said end walls, and the main portion of said closure member being severable from said section to uncover said outlet and foldable for insertion into said outlet to close the same, the last-named closure flap having an opening for receiving the severed end of said main portion for holding said closure member in uncovering relation to said outlet.

7. A dispensing receptacle comprising a body including side and end walls, closure flaps on said side walls, one of said flaps having a removable section capable of forming a discharge outlet in the top of said receptacle, means within said body for discharging a measured quantity of material through said outlet upon inversion of said receptacle, and a closure member forming an extension of the other of said closure flaps for covering said outlet, and said closure member being foldable for insertion into said outlet to close the same.

8. A dispensing receptacle comprising a body including side and end walls, closure flaps on said side walls, one of said flaps having a removable section capable of forming a discharge outlet in the top of said receptacle, means within said body for discharging a measured quantity of material through said outlet upon inversion of said receptacle, and a closure member extending from the other of said flaps for covering said outlet and having a section secured to one of said end walls, the main portion of said closure member being severable from said section to uncover said outlet and being foldable for insertion into said outlet to close the same.

9. A dispensing receptacle comprising a body including side and end walls, one of said walls having a removable section to form a discharge outlet, closure flaps for said body, means within said body for discharging a measured quantity of material through said outlet upon inversion of said receptacle, and a closure member forming an extension of one of said closure flaps for covering said outlet and being foldable for insertion into said outlet to close the same.

10. A dispensing receptacle comprising a body including side and end walls, one of said walls having a removable section to form a discharge outlet, closure flaps for said body, means within said body for discharging a measured quantity of material through said outlet upon inversion of said receptacle, and a closure member extending from one of said flaps for covering said outlet and having a section secured to one of said end walls, the main portion of said closure member being severable from said section to uncover said outlet and being foldable for insertion into said outlet to close the same.

11. A dispensing receptacle comprising a body including end and side walls and having a discharge outlet therein, a discharge chute communicating with said outlet, a partition forming an extension of one of said end walls and combining therewith to form a compartment for receiving a measured quantity of material for discharge through said chute and outlet, said partition having flanges along its longitudinal edges engageable with the opposed side walls of said body, and means cooperating with said partition for directing said material into said compartment.

12. A dispensing receptacle comprising a body having an outlet, a discharge chute in said body communicating with said outlet and having an opening therein reduced adjacent one end to provide shoulders, and an apertured partition insertible through said opening and supported on said shoulders with the reduced end of said opening extending below said partition.

13. A dispensing receptacle comprising a body having a discharge outlet, closure flaps for said body, and a closure member extending from one of said flaps and foldable so as to be recessed within said outlet when closing the same.

14. A dispensing receptacle comprising a body having a discharge outlet, closure flaps for said body, and a closure member forming an extension of one of said flaps and covering said outlet, said closure member having a section secured to said body and the main portion of said member being severable from said section to uncover said outlet, and being thereupon foldable for insertion into said outlet to close the same.

15. A dispensing receptacle comprising a body having a discharge outlet and including an end wall, an extension projecting from said end wall and foldable within said body to provide a discharge chute communicating with said outlet, closure flaps for said body, and a closure member for said outlet forming an extension of one of said flaps and insertable into said outlet to close the same.

16. A dispensing receptacle comprising a body having a discharge outlet and including an end wall, an extension projecting from said end wall and foldable to provide a discharge chute communicating with said outlet, a partition also forming an extension of said end wall and combining therewith to provide a compartment for receiving a measured quantity of material for discharge through said chute and outlet, closure flaps for said body, and a closure member for said outlet forming an extension of one of said flaps and insertable into said outlet to close the same.

ALEXANDER RICE.